(12) United States Patent
Schabenbergers et al.

(10) Patent No.: US 9,308,885 B2
(45) Date of Patent: Apr. 12, 2016

(54) PEDESTRIAN PROTECTION DEVICE FOR A MOTOR VEHICLE

(71) Applicant: Audi AG, Ingolstadt (DE)

(72) Inventors: Richard Schabenbergers, Münchsmünster (DE); Günther Mayrhofer, Oberstimm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/388,668

(22) PCT Filed: Mar. 21, 2013

(86) PCT No.: PCT/EP2013/000858
§ 371 (c)(1),
(2) Date: Sep. 26, 2014

(87) PCT Pub. No.: WO2013/143669
PCT Pub. Date: Oct. 3, 2013

(65) Prior Publication Data
US 2015/0048651 A1    Feb. 19, 2015

(30) Foreign Application Priority Data
Mar. 29, 2012 (DE) .......................... 10 2012 006 496

(51) Int. Cl.
*B60R 21/38* (2011.01)
(52) U.S. Cl.
CPC ..................................... *B60R 21/38* (2013.01)
(58) Field of Classification Search
CPC ....... B60R 21/38; E05D 5/0207; E05D 3/145; E05Y 2900/536; F16C 11/0614; F16C 11/0623; Y10T 403/32647
USPC ........................................................ 180/274
See application file for complete search history.

(56) References Cited

U.S. PATENT DOCUMENTS

| 4,587,760 | A  | * | 5/1986 | Brissette | .......................... 49/252 |
| 6,182,952 | B1 | * | 2/2001 | Gutierrez | ................... 267/64.11 |

(Continued)

FOREIGN PATENT DOCUMENTS

| DE | 202 16 240    | 4/2003 |
| DE | 102010021687  | 12/2011 |

(Continued)

OTHER PUBLICATIONS

International Search Report issued by the European Patent Office in International Application PCT/EP2013/000858 on May 31, 2013.

*Primary Examiner* — Paul N Dickson
*Assistant Examiner* — Timothy Wilhelm
(74) *Attorney, Agent, or Firm* — Henry M. Feiereisen LLC

(57) ABSTRACT

A pedestrian protection device for a motor vehicle, includes a front flap that is connected to a body of the motor vehicle by means of at least one coupling device and at least one adjusting device, by means of which adjusting device the front flap, by way of at least one actuator, can be moved into a protective position that is raised relative to the body of the motor vehicle and can be fixed in the protective position, wherein the at least one actuator is connected to the corresponding coupling device and to the front flap by means of a coupling joint, the coupling joint including a joint head and a joint socket unit that receives the joint head, the joint socket unit having a joint socket and a retaining element that at least partially surrounds the joint socket. The joint head has a joint head end region that visibly interacts with a recess in the joint socket unit.

12 Claims, 5 Drawing Sheets

(56) References Cited

U.S. PATENT DOCUMENTS

| | | | | |
|---|---|---|---|---|
| 6,196,079 | B1 * | 3/2001 | Paparoni | 74/473.15 |
| 6,964,316 | B1 * | 11/2005 | Polz et al. | 180/274 |
| 7,207,406 | B1 * | 4/2007 | Polz et al. | 180/69.21 |
| 7,552,789 | B2 * | 6/2009 | Gust | 180/69.21 |
| 7,594,555 | B2 * | 9/2009 | Lutter et al. | 180/69.21 |
| 7,637,344 | B2 * | 12/2009 | Park | 180/274 |
| 7,854,289 | B2 * | 12/2010 | Gust | 180/274 |
| 8,484,804 | B2 * | 7/2013 | Mehta et al. | 16/370 |
| 8,662,236 | B2 * | 3/2014 | Koestler et al. | 180/274 |
| 2005/0151393 | A1 | 7/2005 | Borg et al. | |
| 2007/0201945 | A1 * | 8/2007 | Scharioth | 403/132 |
| 2009/0255379 | A1 * | 10/2009 | Hsieh | 81/124.5 |
| 2011/0290575 | A1 | 12/2011 | Kaiser et al. | |
| 2011/0290576 | A1 | 12/2011 | Koestler et al. | |

FOREIGN PATENT DOCUMENTS

| | | |
|---|---|---|
| DE | 102010029410 | 12/2011 |
| EP | 1 555 171 | 7/2005 |
| GB | 2 400 827 | 10/2004 |

* cited by examiner

PEDESTRIAN PROTECTION DEVICE FOR A MOTOR VEHICLE

CROSS-REFERENCES TO RELATED APPLICATIONS

This application is the U.S. National Stage of International Application No. PCT/EP2013/000858, filed Mar. 21, 2013, which designated the United States and has been published as International Publication No. WO 2013/143669 A1 and which claims the priority of German Patent Application, Serial No. 10 2012 006 496.9, filed Mar. 29, 2012, pursuant to 35 U.S.C. 119(a)-(d).

BACKGROUND OF THE INVENTION

The invention relates to a pedestrian protection device for a motor vehicle.

An adjustable pedestrian protection device, which is in particular arranged in the front region of a passenger car, is generally known. When a collision with a pedestrian or bicyclers is detected, the pedestrian protection device has the purpose to quickly raise a crash-active front flap in the region of the windshield via one or multiple pyrotechnically controlled actuators so as to assume a protective position which is raised relative to a body of the motor vehicle and to maintain the front flap in the protective position. The front flap, which is fixed in the protective position, serves as impact energy absorbing deformation element and is intended to dampen the impact of a person onto the front flap and thereby reduce the degree or the risk of injury to the person caused by the impact onto the front flap.

From DE 10 2010 021 687 A1 a pedestrian protection device for a motor vehicle is known. The pedestrian protection device includes a front flap which is connected to a body of the motor vehicle via a coupling device and at least one actuating device by which the front flap can be moved relative to the body of the motor vehicle into a protective position by means of an actuator and can be fixed in the protective position. The at least one actuator is respectively connected with the corresponding coupling device and the front flap via a ball joint, wherein the ball joint includes a joint head and a joint socket unit which receives the joint head and which includes a joint socket and a securing element which at least partially surrounds the joint socket. Hereby a joint head of the first ball joint is connected with the front flap and a joint head of the second ball joint is screwed together with the actuator device of the body of the motor vehicle. The ball joints include joint heads, which are completely received in receiving joint sockets of the joint socket unit and are secured by a surrounding securing element. The screwed joint heads are checked by testing the fastening torque of the screwed connection prior to or after the mounting of the actuator.

SUMMARY OF THE INVENTION

An object of the invention is to create a pedestrian protection device for a motor vehicle, which enables a simple and secure mounting of the actuator on the body of the motor vehicle.

According to the invention the object is solved by providing a pedestrian protection device for a motor vehicle including a front flap; at least one coupling device connecting the front flap with a body of the motor vehicle; at least one actuating device comprising an actuator and constructed to move the front flap into a protective position via the actuator and to and fix the front flap in the protective position, said protective position being elevated relative to the motor vehicle, a coupling joint, comprising a joint socket unit and a joint head and received in the joint socket unit, said joint socket unit comprising a joint socket and a securing element which at least partially surrounds the joint socket, wherein the at least one actuator is connected with the at least one coupling device and the front flap via the coupling joint, said joint head having a joint head end region which visibly interacts with a recess in the joint socket unit. Advantageous embodiments and refinements of the invention are set forth in the dependent claims.

In order to create a pedestrian protection device for a motor vehicle which enables a simple and secure mounting of the actuator on the body of the motor vehicle, the joint head according to the invention has a joint head end region which visibly interacts with a recess in the joint socket unit. A significant advantage of the invention is that the visual control allows checking whether the joint head according to the invention has been mounted correctly or proper in a particularly simple and quick manner. Advantageously, compared to the conventional configuration in which the joint head is completely received in the joint socket, the joint head according to the invention can be mounted and checked without tools, which significantly lowers the checking times and with this the mounting costs. A possible incorrect mounting of the fastening of the joint head in the joint socket unit can be visually recognized rapidly and corrected quickly without tools.

In an advantageous embodiment of the pedestrian protection device according to the invention, the joint head end region can protrude outwardly relative to the securing element with a projection. This enables a better visual recognition of the joint head end region during visual inspection and indicates the correct mounting of the joint head in the joint socket. When the joint head end region does not project outwardly relative to the securing element has with a projection the joint head is not correctly mounted in the joint socket. When mounting the actuator, the visible projection of the joint head end region can thus in a simple constructive manner immediately visually indicate the state of the mounted connection.

In a further advantageous embodiment of the pedestrian protection device according to the invention, the joint head end region of the joint head can have a round cross-section, wherein the joint head end region can for example be configured cone-shaped or cylindrical. Advantageously, the joint head with a axially symmetrical round cross-section of the joint head end region can be particularly easily produced as cold extruded part and enable a simple mounting of the joint head. The production as cold extruded part enables advantageously a sufficient strength. Thus the technically improved joint head can be produced and mounted particularly cost-effectively.

In a further advantageous embodiment of the pedestrian protection device according to the invention, the joint head and the joint socket, which receives the joint head, can be configured as plug-in connection. This advantageously enables a particularly fast and simple final mounting of the coupling joint, which in addition is configured constructively simple and as a result can be produced economically or cost-effectively. During repair work on the front flap or when exchanging the actuator, the plug-in connection enables a fast unmounting of the actuator.

In a further advantageous embodiment of the pedestrian protection device according to the invention, the plug-in connection can be configured form fittingly and/or force fittingly. This has the advantage that the joint head can be optimally supported in the joint socket and that when the activation the actuator is activated in the event of a crash, great forces can be reliably and securely transmitted via the form fitting and/or force fitting plug-in connection of the actuator.

In a further advantageous embodiment of the pedestrian protection device according to the invention, the joint head end region can at least partially form a form fitting latching connection with the recess of the joint socket and with the recess of the securing element. Advantageously, in addition to enabling the visual checking, the joint head end region have a function as fastening element of the joint head in the joint socket and a further function as a stop element to stabilize the position of the securing element in axial direction of the actuator. As a result a particularly space-saving and especially load bearing multi-connection of the coupling joint can be realized, which due to its compact construction can also be mounted in vehicles with small space conditions without having to change the dimensions of the vehicle body.

In a further advantageous embodiment of the pedestrian protection device according to the invention, the joint socket can have two slots on its outer conference which are arranged so as to oppose each other and extend in the direction of a center longitudinal axis, and into which bent ends of the securing element latchingly engage. Advantageously the joint head end region of the joint head can have at least one radially circumferential indentation on its outer circumference into which a locking ring latchingly engages, which locking ring extends radially circumferentially on the inner circumference of the securing element. This enables mounting and supporting the securing element on the joint socket in the right position relative to the joint head without great resistance in a constructively simple and a construction space saving manner. The joint socket which has the slot as well as the securing element which has the indentation can be manufactured cost-effectively as mass parts, wherein the joint socket due to the axially arranged slots can be manufactured in a simple injection molding tool and the securing element which has the indentation can be produced in a material removing process as turned part or as cold extruded part.

In a further advantageous embodiment of the pedestrian protection device according to the invention, the joint socket can have a radially circumferential fastening recess on its outer circumference, in which fastening recess the securing element axially is fastened in a form fitting and/or force fitting manner. Advantageously the joint socket can have a radially circumferential fastening recess on its inner circumference for receiving the securing element in which radial circumferential fastening recess the radially circumferential bulge of the securing element is form fittingly and/or force fitting supported and axially fastened. This has the advantage that the securing element after mounting of the joint head in the joint socket can assume an axially defined position in which the securing element partially surrounds the joint head or the joint head partially surrounds the securing element and can thus form a durable connection. Due to the springing effect of the securing element and the latched position in the fastening recess the securing element cannot be displaced inadvertently.

In a further advantageous embodiment of the pedestrian protection device according to the invention, the coupling joint of the actuator can be configured so as to form a plug-in connection with the coupling device and with the front flap. This enables advantageously a fast and durable connection between two components that are movable relative to each other. Such coupling joints can be manufactured cost-effectively and robustly.

BRIEF DESCRIPTION OF THE DRAWING

Advantageous embodiments of the invention are shown in the drawings and are described in the following.

It is shown in.

DETAILED DESCRIPTION OF PREFERRED EMBODIMENTS

Figure 1:
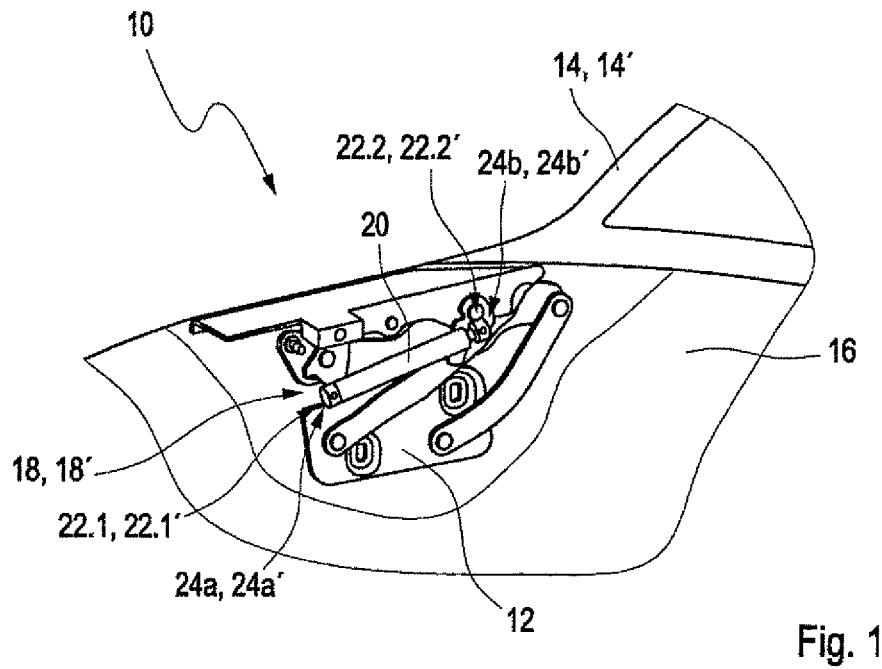
FIG. 1 a perspective representation of the relevant parts of a pedestrian protection device according to the invention for a motor vehicle with a coupling device and an actuator device, FIG. 2 a perspective representation of a first exemplary embodiment of an end region of the actuating device of FIG. 1 prior to mounting the coupling joint, FIG. 3 a perspective representation of the actuating device of FIG. 2 after a correct mounting of the coupling joint with a visible projection of the joint head end region, FIG. 4 a perspective representation of the actuating device of FIG. 2 with an incorrectly mounted coupling joint without projection of the joint head end region, FIG. 5 the perspective representation of the first exemplary embodiment of the joint socket unit consisting of a joint socket and a securing element surrounding the joint socket, FIG. 6 a schematic sectional representation of a second exemplary embodiment of a coupling joint with a joint socket and a securing element prior to mounting of the coupling joint, FIG. 7 a schematic sectional representation of the second exemplary embodiment of FIG. 6 at the beginning of the mounting in a non-locked state, FIG. 8 a schematic sectional representation of the second exemplary embodiment of FIG. 7 with the securing element in a first locked state, and FIG. 9 a schematic sectional representation of the second exemplary embodiment of FIG. 7 after a correct mounting of the coupling joint in a second locked state of the securing element with a visible projection of the joint head end region.

FIGS. 1 to 9 show relevant parts of the pedestrian protection device 10 for a motor vehicle with a front flap 16, which is connected with the vehicle body 14, 14' via a coupling device 12 and an actuating device 18, 18'. Usually such a coupling device 12 and an associated actuating device 18, 18' are arranged on both longitudinal sides of the front flap 16 in order to movably couple the front flap 16 with the motor vehicle body 14, 14'. In the shown exemplary embodiment the actuating device 18, 18' moves the front flap 16 via an actuator 20 into a protective position, which is raised relative to the vehicle body 14, 14' of the motor vehicle, and fixes the front flap 16 in the protective position. The actuator 20 can be connected with the coupling device 12 and the front flap 16 on both ends respectively via a coupling joint 22.1, 22.1', 22.2, 22.2', wherein the coupling joint 22.1, 22.1' 22.2, 22.2' includes a joint head 22.2a, 22.2a' and a joint socket unit 24, 24a', 24b, 24b' which receives the joint head 22.2a, 22.a'. The joint socket unit 24, 24a', 24b, 24b' has a joint socket 24.1, 24.1' and a securing element 24.2, 24.2' which at least partially surrounds the joint socket 24.1, 24.1'. The coupling joint 22.1, 22.1', 22.2, 22.2' functions as a connecting element with a rotation axis between the actuator 20 and the front flap 16 or the coupling device 12. Alternatively, an end region of the actuator 20 can be connected with the front flap 16 or the coupling device 12 via the coupling joint 22.1, 22.1', 22.2, 22.2' according to the invention and the opposing other end of the actuator 20 can be supported in a trough-shaped receptacle or can be connected in a conventional manner with the front flap 16 or the coupling device 12. Preferably the actuator 20 of the actuating device 18, 18' is activated pyrotechnically, wherein the pyrotechnic means can be constructed similar to devices used for triggering an airbag. However, other actuating devices 18, 18', that a person with skill in the art may consider useful, are conceivable for activating the actuator 20 such as pneumatic or electric actuating devices 18, 18'. Because great forces and torques act on the coupling joint 22.1, 22.1', 22.2, 22.2' when of the actuator 20 is activated and as a result of a subsequent impact of a person onto the front flap 16, it has to be ensured that the actuator 20 is correctly mounted on the vehicle body 14, 14' of the motor vehicle.

In order to create a pedestrian protection device 10 for a motor vehicle, which enables a simple and secure mounting of the actuator 20 on the vehicle body 14, 14' of the motor vehicle it is proposed according to the invention that the joint head 22.2a, 22.2a' has a joint head end region 22.2b, 22.2b' which visibly interacts with a recess 24.1a, 24.1a', 24.2a, 24.2a' in the joint socket unit 24a, 24a', 24b, 24b'. In the present exemplary embodiments, the pedestrian protection device 10 is respectively a safety-relevant component whose proper installation is controlled and documented during mounting or in the final inspection. Therefore it is particularly advantageous when the proper or correct installation of the joint head according to the invention in particular the joint head end region. 22.2b, 22.2b' of the joint head 22.2a, 22.2a can be checked particularly simple and fast by visual inspection.

Figure 2:
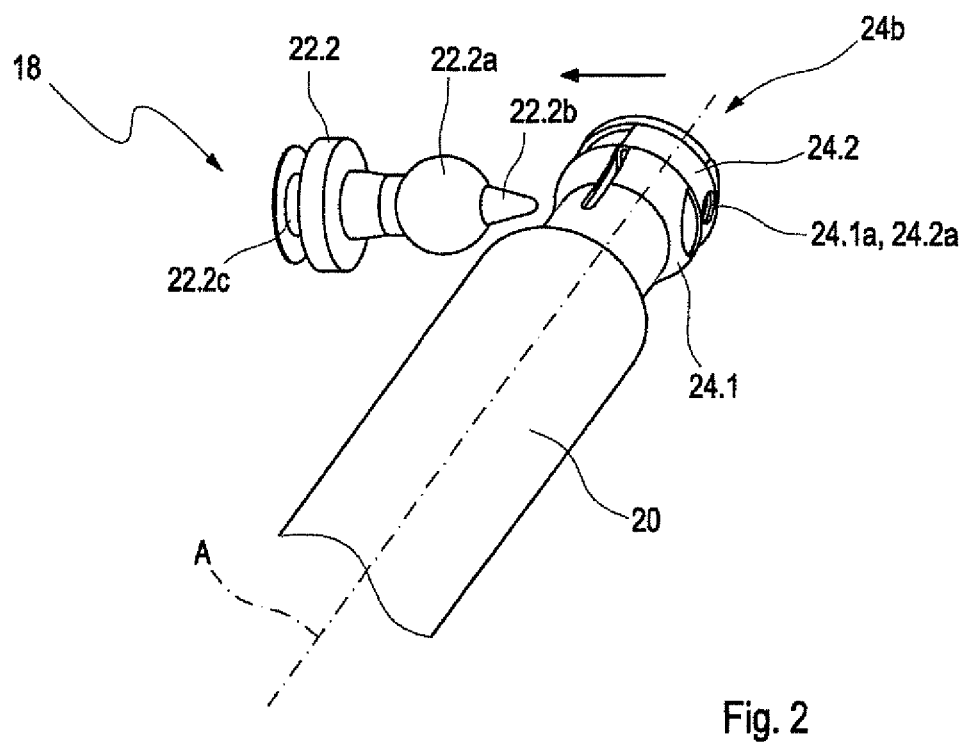
Figure 6:
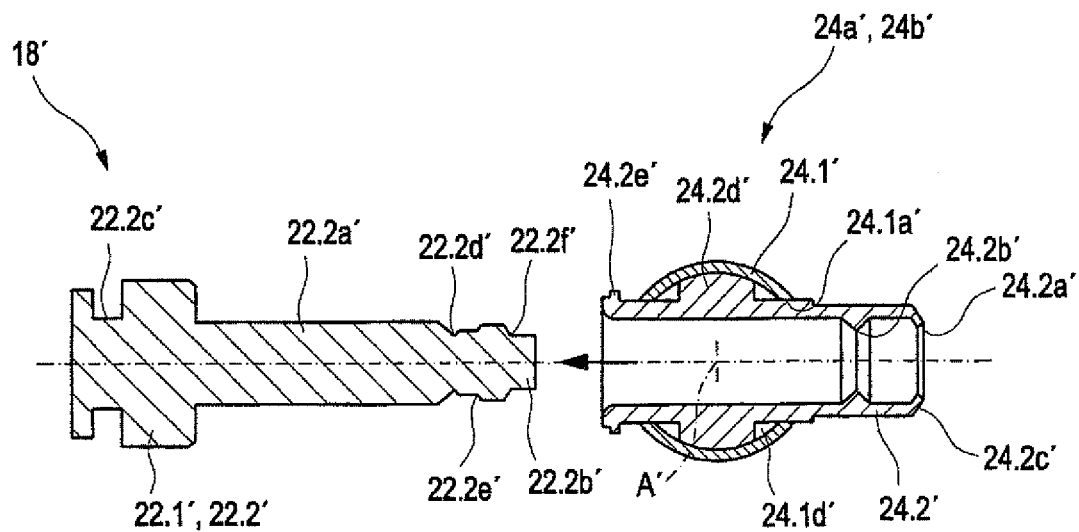

FIGS. 2 and 6 each show in a schematic representation an exemplary embodiment of an end region of the actuator 20 of the actuating device 18, 18' prior to the mounting of the coupling joint 22.1, 22.1', 22.2, 22.2' with the joint socket unit 24a, 24a', 24b, 24b'. The symmetrical coupling joint 22.1, 22.1', 22.2, 22.2' is configured one-piece and has in a region opposite the joint head 22.2a, 22.2a' a radially arranged or radially circumferential groove 22.2c, 2.2c' via which the coupling joint 22.1, 22.1', 22.2, 22.2' of the actuator 20 is connected with the coupling device 12 and/or with the front flap 16 as plug-in connection.

As can be further seen from FIGS. 2 and 6, the joint head end region 22.2b, 22.2b' of the joint head 22.2a, 22.2a' has a round cross-section. In the first exemplary embodiment the joint head end region 22.2b according to FIG. 2 is configured cone-shaped, and in the second exemplary embodiment the joint head end region 22.2b' according to FIG. 6 is configured cylindrical and due to its centered shaped facilitates the mounting of the joint head 22.2a, 22.2a' with the joint socket unit 24a, 24a', 24b, 24b'. In the present exemplary embodiments the joint head 22.2a, 22.2a' and the joint socket unit 24a, 24a', 24b, 24b' which receives the joint head 22.2a, 22.2a' are configured as plug-in connection, wherein the plug-in connection can be configured form fittingly and/or force fittingly.

As visible indication for the correct mounting the joint head end region 22.2b, 22.b' has a projection H, H' which projects outwardly relative to the securing element 24.2, 24.2'. The projection H, H' of the joint head end region 22.2b, 22.2b' prevents an axial movement of the securing element 24.2, 24.2' and with this of the actuator 20 in the direction of the center longitudinal axis A, A'. Compared to the conventional configuration of a joint head, the joint head 22.2a, 22.2a' according to the invention with the projection H, H' offers an additional support surface between the interconnected components and thus an increased resistance against the impact forces generated by activation of the actuator 20. In the present exemplary embodiments the coupling joint 22.1, 22.1', 22.2, 22.2' is configured unicolor and the cone-shaped projection H, H' is well visible during a visual inspec-tion, wherein the joint head end region 22.2b, 22.32b' can be configured red or in another signal color for better recognition.

Figure 3:
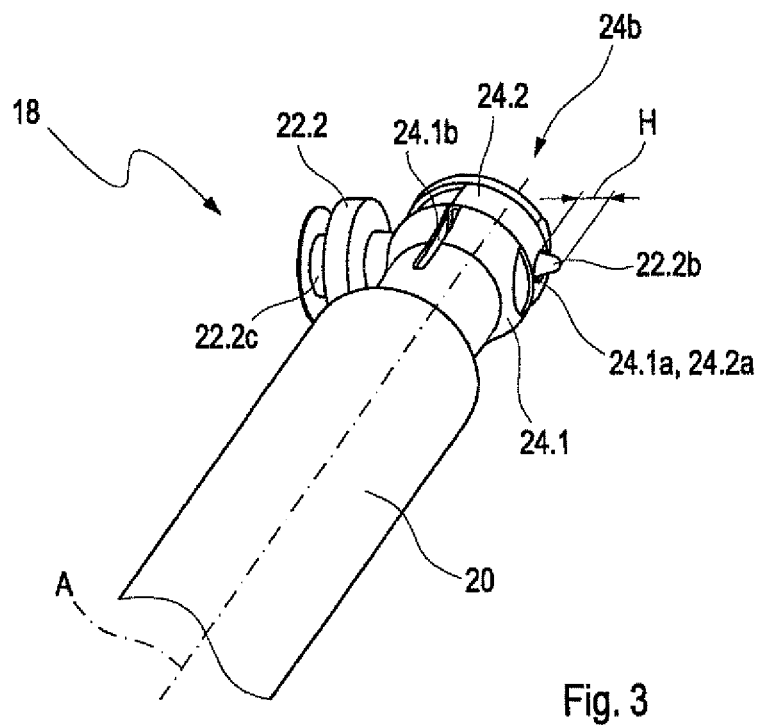
Figure 9:
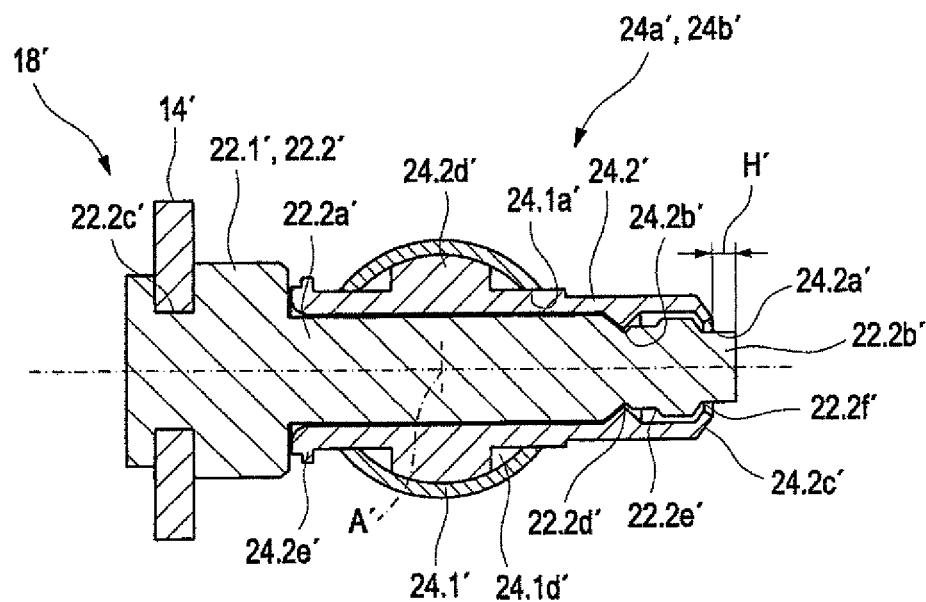

As can be seen from FIGS. 3 and 9, in the mounted position the joint head end region 22.2b, 22.2b' forms at least in regions a form fitting latching connection with the recess 24.1, 24.1a of the joint socket 24.1, 24.1' and with the recess 24.2a, 24.2a' of the securing element 24.2, 24.2'. When the coupling element 22.1, 22.1', 22.2, 22.2' is correctly mounted with the joint socket unit 24a, 24a', 24b, 24b', the form fitting latching engagement ensures that prior to or during activation of the actuator 20 the interconnected components are always correctly positioned. In the case of exchange or repair work, the form fitting latching engagement of the joint head end region 22.2b, 22.b' can be easily released. The main load direction of the actuator 20 extends in the direction of the center longitudinal axis A, A' or perpendicular to the axis of symmetry of the coupling joint 22.1, 22.1', 22.2, 22.2'.

Figure 4:
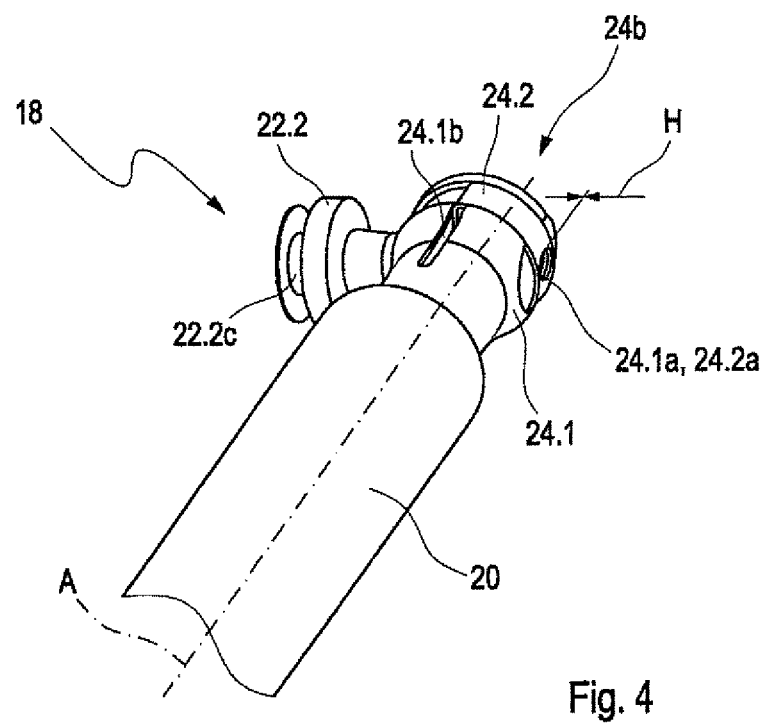
Figure 7:
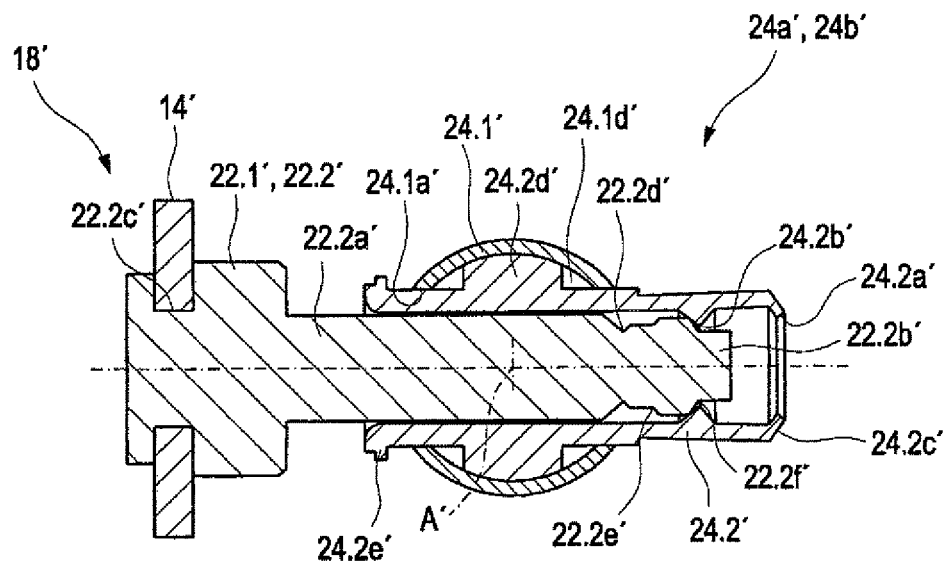
Figure 8:
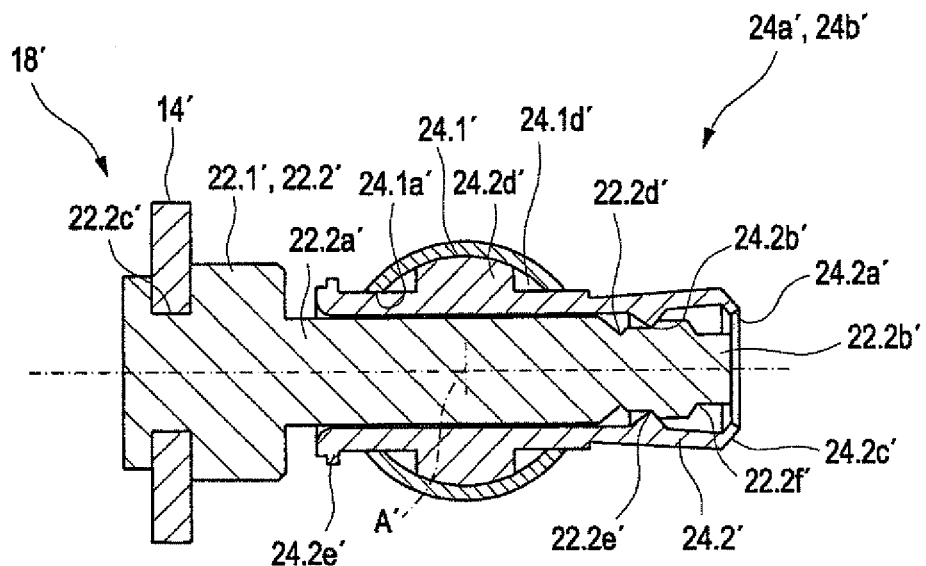

As can be further seen from FIGS. 4, 7 and 8, the joint head end region 22.2b, 22.2b' is not visible in case of an improper mounting of the joint head 22.2a, 22.2a' with the joint socket unit 24a, 24a', 24b, 24b'. This provides an optically recognizable indication that the joint head 22.2a, 22.2a' is not properly mounted or latched with the securing element 24.2, 24.2' and that the incorrect mounting has to be corrected.

Figure 5:
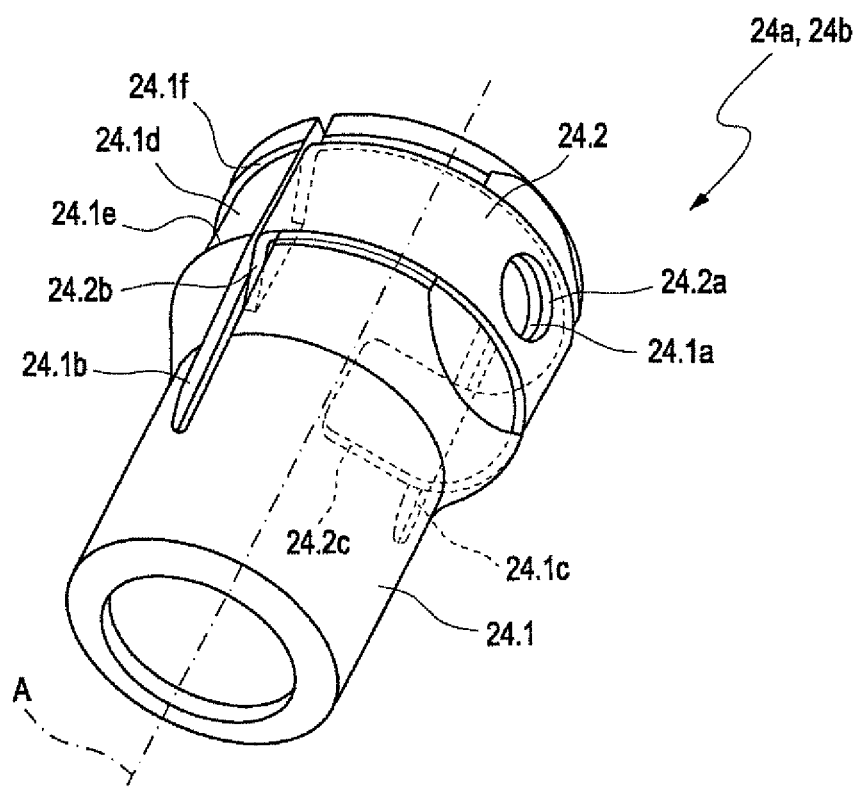

As can further be seen from FIG. 5 the joint socket 24.1 in the first exemplary embodiment has two slots 24.1b, 24.1c on the outer circumference arranged so as to oppose each other which extend in the direction of a center longitudinal axis A, and into which bent ends 24.2b, 24.cs of the securing element 24.2 latchingly engage. As a result, the securing element 24.2 is mounted on the outer circumference of the joint socket 24.1 in a defined position relative to the joint head 22.2a and can ideally embrace the latter. As a further constructive and position-defining measure, the joint socket 24.1 has a fastening recess 24.1d, which extends radially about its outer circumference and into which the securing element 24.2 can be axially fixed in a form fitting and/or force fitting manner. As a result, the delimiting stops 24.1e, 24.1f of the fastening recess 24.1d prevent in addition to the fastening of the joint head 22.2a via the joint head end region 22.2b a movement of the securing element 24.2 and of the joint head 22.2a in axial direction of the center longitudinal axis A. As a result, the actuator 20 can only perform a rotating movement about the axis of symmetry of the ball joint 22.1, 22.2, whereby the actuating device 18 is always arranged in a defined position relative to the front flap 16. In addition due to its spring action the securing element 24.2 is optimally supported in the radially circumferential fastening recess 24.1d and cannot inadvertently fall out.

As can be further seen from FIGS. 6 to 9, the joint socket 24.1' in the second exemplary embodiment has a fastening recess 24.1d' which extends radially along its inner circumference for receiving the securing element 24.2', in which fastening recess a radially circumferential bulge 24.2d' of the securing element 24.2' is form fittingly and/or force fittingly supported and axially fastened. Because the ball-shaped joint socket 24.1' surrounds the securing element 24.2' and secures the securing element against falling out, the securing element 24.2' is supported in the joint socket 24.1' in a defined position parallel and perpendicular to the center longitudinal axis A' of the actuator 20. The securing element 24.2' has on a side which faces the coupling element 22.1', 22.2' a circumferential nose 24.2e', which serves as a stop for a positionally accurate mounting onto the coupling joint 22.1' 22.2' and as additional securing against falling out of the joint socket 24.1'. The end of the securing element 24.2' which opposes the nose 24.2e' has on its inner circumference two radially inwardly oriented circumferential locking rings 24.2b', 24.2c' which are operatively connected with the joint head end region 22.2b' of the joint head 22.2a', wherein the locking ring 24.2b' which lies within the securing element 24.2' is configured V-shaped and the locking ring 24.2c' is arranged as protruding nose on the end side of the securing element 24.2'.

The joint head end region 22.2b' of the joint head 22.2a' has on its outer circumference at least one radially circumferential indentation 22.2d', 22.2e', 22.2f into which a locking ring 24.2b' 24.2c' which radially extends around the inner circumference of the securing element 24.2' latches. As can be further seen from FIG. 7, at the beginning of the mounting the joint head 22.2a' and the joint socket 24a', 24b' are in a non-locked state. As mounting progresses the joint head 22.2a' is in a first locking position shown in FIG. 8, in which it is already latchingly engaged with the joint socket 24a', 24b' in the indentation 22.2e' of the joint head 22.2a' via the locking ring 24.2b' of the securing element 24.2' without a visible projection H' of the joint head end region 22.2b'. In a second locking position according to FIG. 9 the joint head 22.2a' is correctly mounted in the joint socket 24a', 24b' and is situated in its final position. In this final position the locking ring 24.2b' of the securing element 24.2' is latchingly engaged in the indentation 22.2d' of the joint head 22.2a' and the locking ring 24.2c' of the securing element 24.2' in the indentation 22.2f of the joint head 22.2a' of the securing element with a visible projection H' of the joint head end region 22.2b'. When the coupling joint 22.1', 22.2' is correctly mounted with the joint socket 24a', 24b', both locking rings 24.b', 24.2c' of the securing element 24.2' are latchingly engaged in the indentations 22.2d' and 22.2f' of the joint head 22.2a' and the nose 24.2e' of the securing element 24.2' is situated on the stop with the coupling joint 22.1', 22.2'. In this locking position of the coupling joint 22.2', 22.2' a clearly visible projection H' of the joint head end region 22.2b' can be recognized, which allows ensuring the right position of the interconnected components.

What is claimed is:

1. A pedestrian protection device for a motor vehicle, comprising:
    a front flap;
    at least one coupling device connecting the front flap with a body of the motor vehicle;
    at least one actuating device comprising an actuator and constructed to move the front flap into a protective position via the actuator and to and fix the front flap in the protective position, said protective position being elevated relative to the motor vehicle,
    a coupling joint, comprising a joint socket unit and a joint head and received in the joint socket unit, said joint socket unit comprising a joint socket and a securing element which is associated with the joint socket, wherein the at least one actuator is connected with the at least one coupling device and the front flap via the coupling joint, said joint head having a joint head end region which visibly interacts with a recess in the joint socket unit and connects said joint head with the joint socket unit, said coupling joint in a region opposite to said joint head has a radially circumferential groove via which the coupling joint is connected with the coupling device and/or with the front flap.

2. The pedestrian protection device of claim 1, wherein the joint head end region has a projection, which projects outwardly relative to the securing element.

3. The pedestrian protection device of claim 1, wherein the joint head end region of the joint head has a cone-shaped cross-section.

4. The pedestrian protection device of claim 1, wherein the joint head with the joint head end region is configured as cold extruded part.

5. The pedestrian protection device of claim 1, wherein the joint head and the joint socket unit, which receives the joint head are configured as plug-in connection.

6. The pedestrian protection device of claim 5, wherein the plug-in connection is configured form fittingly and/or force fittingly.

7. The pedestrian protection device of claim 1, wherein the joint head end region forms at least in regions a form fitting latching engagement with the recess of the joint socket and with the recess of the securing element.

8. The pedestrian protection device of claim 1, wherein an outer circumference of the joint socket is provided with two slots arranged in opposition to each other and extending in a direction of a center longitudinal axis, and wherein bent ends of the securing element latchingly engage in the two slots.

9. The pedestrian protection device of claim 1, wherein an outer circumference of the joint socket is provided with a radially circumferential fastening recess, wherein the securing element is form fittingly and/or force fittingly fastened in the fastening recess.

10. The pedestrian protection device of claim 1, wherein the joint socket has an inner circumference provided with a radially circumferential fastening recess for receiving the securing element, wherein a radially circumferential bulge of the securing element is form fittingly and/or force fittingly axially fastened in the fastening recess.

11. The pedestrian protection device of claim 10, wherein an outer circumference of the joint head end region of the joint head has at least one radially circumferential indentation, wherein a locking ring which radially extends on an inner circumference of the securing element latchingly engages in the at least one radially circumferential indentation.

12. The pedestrian protection device of claim 1, wherein the coupling joint of the actuator together with the coupling device and with the front flap is configured as plug-in connection.

* * * * *

UNITED STATES PATENT AND TRADEMARK OFFICE
CERTIFICATE OF CORRECTION

PATENT NO. : 9,308,885 B2
APPLICATION NO. : 14/388668
DATED : April 12, 2016
INVENTOR(S) : Richard Schabenberger and Günther Mayrhofer It is certified that error appears in the above-identified patent and that said Letters Patent is hereby corrected as shown below:

On the title page under (72) Inventors: please correct the first inventor's last name to read --SCHABENBERGER-- instead of "SCHABENBERGERS".

Signed and Sealed this
Fourteenth Day of June, 2016

Michelle K. Lee
*Director of the United States Patent and Trademark Office*